T. J. Lloyd,
Pipe Cutter.
Nº 18,918.                     Patented Dec. 22, 1857.
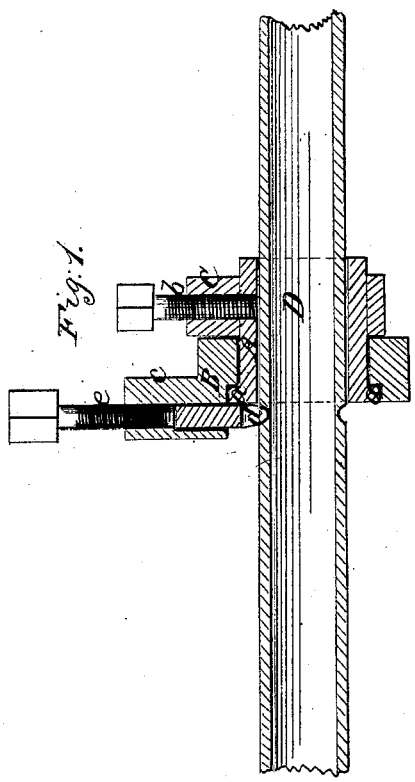
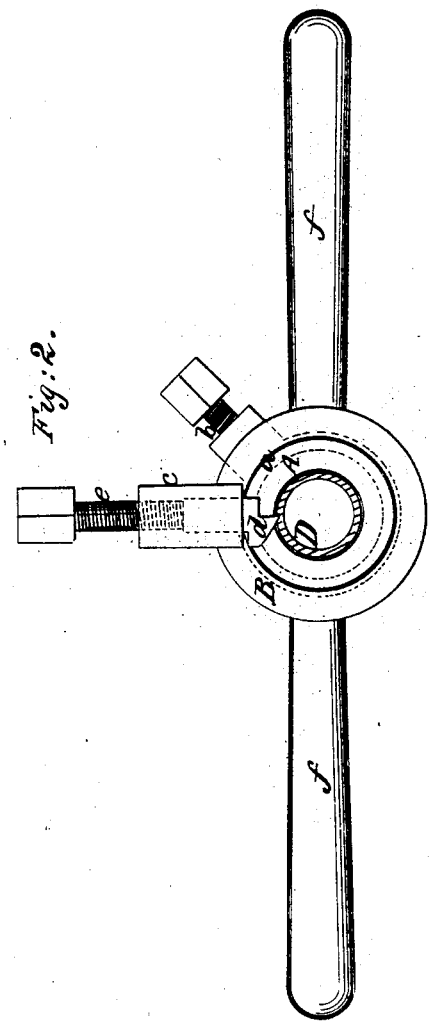

UNITED STATES PATENT OFFICE.

THOS. J. LLOYD, OF POTTSVILLE, PENNSYLVANIA.

IMPLEMENT FOR CUTTING METAL TUBES.

Specification of Letters Patent No. 18,918, dated December 22, 1857.

*To all whom it may concern:*

Be it known that I, THOMAS J. LLOYD, of Pottsville, in the county of Schuylkill and State of Pennsylvania, have invented a new and useful Implement or Device for Cutting Metal Tubing; and I do hereby declare that the following is a full, clear, and exact description of the same, reference being had to the annexed drawings, making a part of this specification, in which—

Figure 1, is a vertical section of my improvement, with a tube fitted within it, the tube being bisected longitudinally and in the same plane as the implement. Fig. 2, is a front view of my improvement.

Similar letters of reference indicate corresponding parts in both figures.

My invention consists in having a metal collar provided at one end with a flanch which fits in a recess in a circular stock which is fitted loosely on the collar. The opposite end of the collar has a ring secured upon it by a screw which passes through the ring and also through the collar and presses or bears against the tube to be cut which is fitted within the collar. The stock is fitted and works between the flanch and ring and a cutting tool is fitted in a socket attached to the stock. The tube is cut by rotating the stock on the collar, the cutter being fed to its work by a screw operated by hand.

The implement is designed chiefly for cutting gas and similar tubing.

To enable those skilled in the art to fully understand and construct my invention, I will proceed to describe it.

A, represents a metal collar having a flanch $a$ on one end, the flanch projecting at right angles from the collar.

B, represents an annular metal stock in which the collar A is fitted, the flanch $a$ fitting in a recess in the stock, and C is a ring which is fitted on the collar A at the end opposite to that on which the flanch is formed. The stock is between the flanch and the ring and is consequently secured on the collar. The stock is allowed to turn freely on the collar A. The ring C is secured on the collar by a screw $b$, which passes through the ring and also through the collar A.

D, represents a tube to be cut. This tube is fitted within the collar A, and is secured therein by the screw $b$.

On the stock B, a socket $c$, is formed—in which a cutter $d$, is fitted. The cutting edge of the cutter may be of pointed V-form or of any other desirable shape. In the outer end of the socket $c$, a screw $e$, is placed, the inner end of which bears against the outer end of the cutter $d$.

The collar A, is adjusted on the tube at the desired point and the tube being firmly held or secured in any proper manner, the stock B, is rotated or turned by grasping handles $f, f$, attached to the stock, and the cutter $d$, is fed or moved down into the tube by turning the screw $e$, by hand, the screw $e$, feeding the cutter to its work, until the tube is cut through.

This is an exceedingly simple and efficient implement and is far preferable to a saw for cutting tubing, the implement performing the work smoother and without bending the tube. Tubing of various diameters or sizes may be cut by using collars having different sized bores or internal diameters, the outer diameters being the same.

Having thus described my invention, what I claim as new and desire to secure by Letters Patent is:

The collar A, having the stock B, fitted loosely thereon, and secured in proper position by the flanch $a$, and ring C—the stock B, having a socket $c$, attached, in which a cutter $d$, and screw $e$, are fitted and the whole arranged substantially as shown for the purpose specified.

THOS. J. LLOYD.

Witnesses:
WM. M. RANDENBUS,
DAVID LLOYD,
SAML. GARRETT.